(12) United States Patent
Seo et al.

(10) Patent No.: US 11,594,744 B2
(45) Date of Patent: Feb. 28, 2023

(54) HYBRID DEHYDROGENATION REACTION SYSTEM

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Jihui Seo, Ulsan (KR); Jin Woo Choung, Suwon-si (KR); Pyung Soon Kim, Suwon-si (KR); Suk Woo Nam, Seoul (KR); Hyangsoo Jeong, Seoul (KR); Yongmin Kim, Seoul (KR); Jaewon Kirk, Seoul (KR); Chang Won Yoon, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

(*) Notice: Subject to any disclaimer, the term of this patent is extended or adjusted under 35 U.S.C. 154(b) by 51 days.

(21) Appl. No.: 17/348,578

(22) Filed: Jun. 15, 2021

(65) Prior Publication Data
US 2022/0255101 A1   Aug. 11, 2022

(30) Foreign Application Priority Data
Feb. 8, 2021   (KR) .................. 10-2021-0017386

(51) Int. Cl.
*H01M 8/0612*   (2016.01)
*B01J 19/24*   (2006.01)
(Continued)

(52) U.S. Cl.
CPC ....... *H01M 8/0612* (2013.01); *B01J 19/2445* (2013.01); *C01B 3/0015* (2013.01); *C01B 3/065* (2013.01); *H01M 8/065* (2013.01)

(58) Field of Classification Search
CPC .. H01M 8/0612; H01M 8/065; B01J 19/2445; C01B 3/0015; C01B 3/065
See application file for complete search history.

(56) References Cited

U.S. PATENT DOCUMENTS

| | | | |
|---|---|---|---|
| 5,372,617 | A | 12/1994 | Kerrebrock et al. |
| 2002/0081235 | A1 | 6/2002 | Baldwin et al. |

(Continued)

FOREIGN PATENT DOCUMENTS

| | | | |
|---|---|---|---|
| CN | 106334561 A | | 1/2017 |
| CN | 113387327 A | * | 9/2021 |

(Continued)

OTHER PUBLICATIONS

Machine Translation of CN113387327A (Sep. 12, 2022) (Year: 2022).*

(Continued)

*Primary Examiner* — Matthew J Merkling
(74) *Attorney, Agent, or Firm* — Lempia Summerfield Katz LLC (57) ABSTRACT

A hybrid dehydrogenation reaction system includes: an acid aqueous solution tank having an acid aqueous solution; an exothermic dehydrogenation reactor including a chemical hydride of a solid state and receiving the acid aqueous solution from the acid aqueous solution tank for an exothermic dehydrogenation reaction of the chemical hydride and the acid aqueous solution to generate hydrogen; an LOHC tank including a liquid organic hydrogen carrier (LOHC); and an endothermic dehydrogenation reactor receiving the liquid organic hydrogen carrier from the LOHC tank and (Continued)

generating hydrogen through an endothermic dehydrogenation reaction of the liquid organic hydrogen carrier by using heat generated from the exothermic dehydrogenation reactor.

16 Claims, 8 Drawing Sheets

(51) Int. Cl.
  *H01M 8/065* (2016.01)
  *C01B 3/00* (2006.01)
  *C01B 3/06* (2006.01)

(56) References Cited

U.S. PATENT DOCUMENTS

| | | | |
|---|---|---|---|
| 2005/0036941 | A1 | 2/2005 | Bae et al. |
| 2007/0020172 | A1 | 1/2007 | Withers-kirby et al. |
| 2007/0207085 | A1 | 9/2007 | Troczynski |
| 2011/0194992 | A1 | 8/2011 | Barton et al. |
| 2015/0207160 | A1 | 7/2015 | Masetti-placci et al. |
| 2021/0299627 | A1* | 9/2021 | Nam ............... B01J 19/0013 |
| 2022/0115682 | A1* | 4/2022 | Allinson ............ H01M 8/0656 |

FOREIGN PATENT DOCUMENTS

| | | |
|---|---|---|
| KR | 101584518 B1 | 1/2016 |
| WO | 2005102914 A2 | 11/2005 |

OTHER PUBLICATIONS

M. Niermann et al., Liquid organic hydrogen carriers (LOHCs)—techno-economic analysis of LOHCs in a defined process chain, Energy Environ. Sci., 2019, 12; https://doi.org/10.1039/C8EE02700E; 18 pp.

Soon-Mo Kwon et al., Development of a high-storage-density hydrogen generator using solid-state NaBH4 as a hydrogen source for unmanned aerial vehicles, Applied Energy; vol. 251, Oct. 1, 2019, https://doi.org/10.1016/j.apenergy.2019.113331; 9 pp.

Keceli et al.; "Ruthenium(III) acetylacetonate: A homogeneous catalyst in the hydrolysis of sodium borohydride", Journal of Molecular Catalysis A: Chemical 286; 2008; pp. 87-91.

Office Action cited in U.S. Appl. No. 17/348,539; dated Oct. 5, 2022; 6 pp.

Office Action cited in U.S. Appl. No. 17/348,552; dated Jan. 17, 2023; 11 pp.

\* cited by examiner

001
HYBRID DEHYDROGENATION REACTION SYSTEM

CROSS-REFERENCE TO RELATED APPLICATION

This application claims priority to and the benefit of Korean Patent Application No. 10-2021-0017386 filed in the Korean Intellectual Property Office on Feb. 8, 2021, the entire contents of which are incorporated herein by reference.

BACKGROUND

(a) Field of the Disclosure

The present disclosure relates to a hybrid dehydrogenation reaction system for supplying hydrogen to a fuel cell stack.

(b) Description of the Related Art

Due to depletion of fossil energy and environmental pollution problems, there is a great demand for renewable and alternative energy, and hydrogen is attracting attention as one of such alternative energies.

A fuel cell and a hydrogen combustion device use hydrogen as a reaction gas, and in order to apply the fuel cell and the hydrogen combustion device to vehicles and various electronic products, for example, a stable and continuous supply technology of hydrogen is required.

In order to supply hydrogen to a device that uses hydrogen, a method of receiving hydrogen from a separately installed hydrogen supply source may be used. In this way, compressed hydrogen or liquefied hydrogen may be used for hydrogen storage.

Alternatively, a method of generating hydrogen through a reaction of a corresponding material after mounting a material in which hydrogen is stored on a device using hydrogen and supplying it to the device using hydrogen may be used. For this method, for example, a method using a liquid organic hydrogen carrier (LOHC), an adsorption method, a desorption/carbon (absorbents/carbon) method, and chemical hydrogen storage have been proposed.

However, the dehydrogenation of the liquid organic hydrogen carrier is an endothermic reaction, thereby requiring a heat source to supply reaction heat. A system is known that generates heat by burning some of the generated hydrogen to supply the heat required for the dehydrogenation reaction of liquid organic hydrogen carriers.

However, when the dehydrogenation reaction heat of the liquid organic hydrogen carrier is provided using a hydrogen burner, the hydrogen storage efficiency of the dehydrogenation system is reduced by about 40% compared to a conventional compressed gas hydrogen ($CGH_2$) system. In addition, in order to satisfy the reaction temperature condition of 200° C. or higher, it may take 10 minutes or greater to generate hydrogen during the system operation.

Therefore, a system with high thermal efficiency and operation responsiveness is desired compared to the conventional method.

The above information disclosed in this Background section is only for enhancement of understanding of the background of the disclosure, and therefore it may contain information that does not form the prior art that is already known in this country to a person of ordinary skill in the art.

SUMMARY

An embodiment is to provide a hybrid dehydrogenation reaction system, in which a stable hydrogen generation is possible within minutes during operation, resulting in excellent operation responsiveness and improving thermal efficiency to secure high hydrogen storage capacity and in which a stable heat treatment and hydrogen generation speed improvement are possible through a combination of two systems.

According to an embodiment, a hybrid dehydrogenation reaction system includes: an acid aqueous solution tank including an acid aqueous solution; an exothermic dehydrogenation reactor including a chemical hydride of a solid state and receiving the acid aqueous solution from the acid aqueous solution tank for an exothermic dehydrogenation reaction of the chemical hydride and the acid aqueous solution to generate hydrogen; an LOHC tank including a liquid organic hydrogen carrier (LOHC); and an endothermic dehydrogenation reactor receiving the liquid organic hydrogen carrier from the LOHC tank and generating hydrogen through an endothermic dehydrogenation reaction of the liquid organic hydrogen carrier by using heat generated from the exothermic dehydrogenation reactor.

The chemical hydride may include sodium borohydride ($NaBH_4$), lithium borohydride ($LiBH_4$), potassium borohydride ($KBH_4$), ammonium borohydride ($NH_4BH_4$), ammonia borohydride ($NH_3BH_3$), tetramethyl ammonium borohydride ($(CH_3)_4NH_4BH_4$), sodium aluminum hydride ($NaAlH_4$), lithium aluminum hydride ($LiAlH_4$), potassium aluminum hydride ($KAlH_4$), calcium diborohydride ($Ca(BH_4)_2$), magnesium diborohydride ($Mg(BH_4)_2$), sodium gallium hydride ($NaGaH_4$), lithium gallium hydride ($LiGaH_4$), potassium gallium hydride ($KGaH_4$), lithium hydride ($LiH$), calcium hydride ($CaH_2$), magnesium hydride ($MgH_2$), or a mixture thereof.

The acid may include sulfuric acid, nitric acid, phosphoric acid, hydrochloric acid, boric acid, a heteropoly acid, acetic acid, formic acid, malic acid, citric acid, tartaric acid, ascorbic acid, lactic acid, oxalic acid, succinic acid, tauric acid, or a mixture thereof.

In the exothermic dehydrogenation reactor, the exothermic dehydrogenation reaction may be performed by reacting 1 mol of hydrogen atoms of the chemical hydride with an acid and water at a molar ratio of 0.5 to 2.

In the exothermic dehydrogenation reactor, the temperature of the exothermic dehydrogenation reaction may be 10° C. to 400° C. and a pressure may be 1 bar to 100 bar.

The liquid organic hydrogen carrier may include decalin (decahydronaphthalene), tetralin (1,2,3,4-tetrahydronaphthalene), cyclohexane, dicyclohexyl, methylcyclohexane (MCH), N-ethylcarbazole (NEC), perhydro-N-ethylcarbazole, dibenzyltoluene (DBT), a mixture of biphenyl and diphenyl methane (BPDM), or a combination thereof.

In the endothermic dehydrogenation reactor, the endothermic dehydrogenation reaction may be performed under a presence of a catalyst including platinum/aluminum oxide ($Pt/Al_2O_3$), platinum/carbon ($Pt/C$), palladium/aluminum oxide ($Pd/Al_2O_3$), palladium/carbon ($Pd/C$), platinum-tin/aluminum oxide ($Pt—Sn/Al_2O_3$), platinum-palladium/aluminum oxide ($Pt—Pd/Al_2O_3$), platinum-rhodium/aluminum oxide ($Pt—Rh/Al_2O_3$), platinum-ruthenium/aluminum oxide ($Pt—Ru/Al_2O_3$), platinum-iridium/aluminum oxide ($Pt—Ir/Al_2O_3$), or a combination thereof.

The catalyst may include 0.1 wt % to 5.0 wt % of a noble metal with respect to the entire catalyst.

In the endothermic dehydrogenation reactor, the endothermic dehydrogenation reaction may take place at 150° C. to 350° C.

The hybrid dehydrogenation reaction system may further include a heat source supplying heat to the endothermic dehydrogenation reactor.

A fuel cell stack generating electricity and water by receiving hydrogen and oxygen produced from the exothermic dehydrogenation reactor, the endothermic dehydrogenation reactor, or both may be further included.

The endothermic dehydrogenation reactor may further use heat generated from the fuel cell stack for the endothermic dehydrogenation reaction of the liquid organic hydrogen carrier.

The hybrid dehydrogenation reaction system may further include a hydrogen separator separating hydrogen from a reaction product generated from the endothermic dehydrogenation reactor.

The hybrid dehydrogenation reaction system may further include a buffer tank storing hydrogen generated from the exothermic dehydrogenation reactor and the endothermic dehydrogenation reactor.

The hybrid dehydrogenation reaction system may further include a pressure regulator between the exothermic dehydrogenation reactor and the buffer tank, between the endothermic dehydrogenation reactor and the buffer tank, or both.

The hybrid dehydrogenation reaction system may further include a pump for supplying the acid aqueous solution from the acid aqueous solution tank to the exothermic dehydrogenation reactor, a pump for supplying the liquid organic hydrogen carrier from the LOHC tank to the endothermic dehydrogenation reactor, or both.

The stable hydrogen generation is possible within minutes during the operation in the hybrid dehydrogenation reaction system according to an embodiment, excellent operation responsiveness and improvement in thermal efficiency to secure high hydrogen storage capacity and a stable heat treatment and hydrogen generation speed improvement are possible through a combination of two systems.

DETAILED DESCRIPTION OF THE EMBODIMENTS

The advantages, features, and aspects that are described hereinafter should become apparent from the following description of the embodiments with reference to the accompanying drawings, which is set forth hereinafter. However, the present disclosure may be not limited to embodiments that are described herein. Although not specifically defined, all of the terms including the technical and scientific terms used herein have meanings understood by persons having ordinary skill in the art. The terms have specific meanings coinciding with related technical references and the present specification as well as lexical meanings. In other words, the terms are not construed as having idealized or formal meanings. Throughout the specification and claims which follow, unless explicitly described to the contrary, the word "comprise/include" or variations such as "comprises/includes" or "comprising/including" should be understood to imply the inclusion of stated elements but not the exclusion or any other elements.

The terms of a singular form may include plural forms unless referred to the contrary.

In the drawings, the thickness of layers, films, panels, regions, etc., are exaggerated for clarity. Like reference numerals designate like elements throughout the specification.

Figure 1:
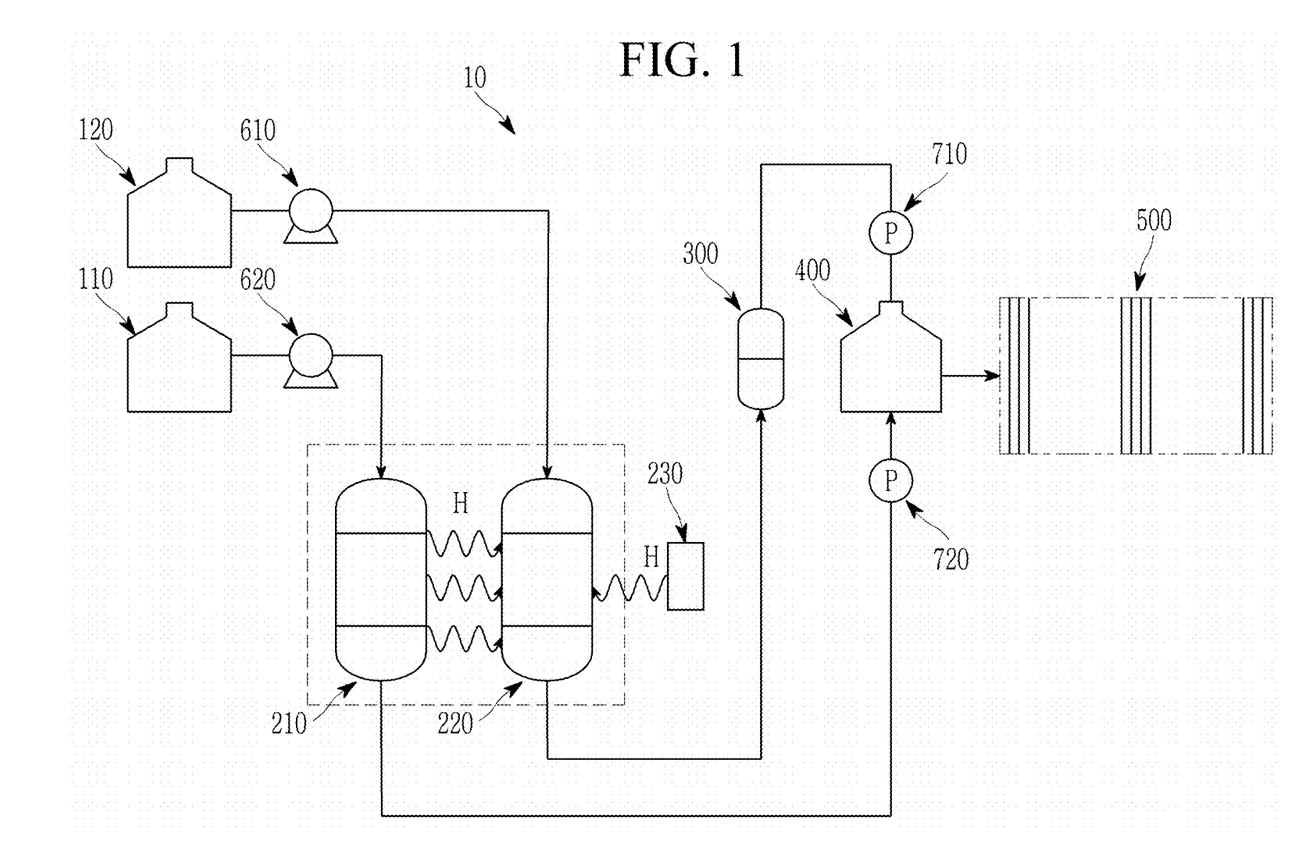
FIG. 1 is a view schematically showing a hybrid dehydrogenation reaction system according to an embodiment.

FIG. 1 is a view schematically showing a hybrid dehydrogenation reaction system according to an embodiment. Now, a hybrid dehydrogenation reaction system is described in detail with reference to FIG. 1.

Referring to FIG. 1, a hybrid dehydrogenation reaction system 10 includes an acid aqueous solution tank 110, an exothermic dehydrogenation reactor 210, an LOHC tank 120, and an endothermic dehydrogenation reactor 220. In other words, the hybrid dehydrogenation reaction system 10 is a hybrid system including an exothermic dehydrogenation reactor 210 and an endothermic dehydrogenation reactor 220.

The acid aqueous solution tank 110 includes an acid aqueous solution. The acid aqueous solution supplies protons and water used for the hydrolysis reaction of a chemical hydride of a solid state, thereby promoting the exothermic dehydrogenation reaction. The acid may be an inorganic acid such as sulfuric acid, nitric acid, phosphoric acid, boric acid, or hydrochloric acid, an organic acid such as a heteropolyacid, acetic acid, formic acid, malic acid, citric acid, tartaric acid, ascorbic acid, lactic acid, oxalic acid, succinic acid, and tauric acid, or mixtures thereof, and because the molecular weight is small compared to the hydrogen ion, the system weight may be reduced and formic acid (HCOOH) may be used as it is safer than hydrochloric acid in a high concentration state. In the case of formic acid, as a weak acid, the pH is maintained, in one example, at about 2 under the conditions described in the present disclosure, so it may be used relatively safely. In addition, the captured carbon dioxide may be obtained through hydrogenation, so it is an important material in terms of a recycling/recirculating of carbon dioxide. In addition, formate is converted to bicarbonate through a dehydrogenation reaction, whereby additional hydrogen may be obtained. The acid aqueous solution tank 110 supplies the acid aqueous solution to the exothermic dehydrogenation reactor 210. Between the acid aqueous solution tank 110 and the exothermic dehydrogenation reactor 210, a pump 620 for supplying the acid aqueous solution to the exothermic dehydrogenation reactor 210 may be included.

The exothermic dehydrogenation reactor 210 includes the chemical hydride of the solid state.

The chemical hydride as a solid state, for example, may be in a form of any one of a powder, a grain, a bead, a microcapsule, and a pellet. When the chemical hydride is stored in an aqueous solution (for example, a concentration of about 20% of the chemical hydride), a large amount of the chemical hydride 111 may not be stored, but when the chemical hydride is stored in a solid state, large capacity storage is possible.

The chemical hydride may be any compound that may be hydrolyzed to generate hydrogen and hydrolysate, for example, may include $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $(CaBH_4)_2$, $Mg(BH_4)_2$, $NaGaH_4$, $LiGaH_4$, $KGaH_4$, $LiH$, $CaH_2$, $MgH_2$, or mixture thereof, particularly it may be $NaBH_4$.

In the exothermic dehydrogenation reactor 210, the exothermic dehydrogenation reaction in which hydrogen is produced by the hydrolysis reaction of the chemical hydride by the acidic aqueous solution proceeds.

For example, when the chemical hydride is $NaBH_4$ and the acid is $HCOOH$, the exothermic dehydrogenation reaction is generated like Reaction Formula 1 below.

$NaBH_4+HCOOH+4H_2O \rightarrow HCOONa+H_3BO_3+H_2O+ 4H_2 \rightarrow HCO_3Na+H_3BO_3+5H_2$     [Reaction Formula 1]

At this time, in the exothermic dehydrogenation reactor 210, the exothermic dehydrogenation reaction may be performed by reacting 1 mol of hydrogen atoms of the chemical hydride with an acid and water at a molar ratio of 0.5 to 2. If the molar ratio of acid and water is less than 0.5, the chemical hydride may not react sufficiently, and if it is greater than 2, the system weight and reactor volume may increase. Meanwhile, the reaction heat generated from the exothermic dehydrogenation reactor 210 is transferred to the endothermic dehydrogenation reactor 220 and is used to drive the dehydrogenation reaction of the organic hydrogen carrier of the liquid.

Accordingly, since there is no need to supply heat to the endothermic dehydrogenation reactor 220 after burning a part of the generated hydrogen to generate heat, heat efficiency may be improved and high hydrogen storage capacity may be secured.

In addition, when the acid and the water are used to generate hydrogen from the chemical hydride, the water is easily evaporated due to the exothermic reaction (a water vaporization temperature: 175° C. at 10 bar, 260° C. at 50 bar) and the generation amount of hydrogen (i.e., a hydrogen storage capacity) may be deteriorated. However, by transferring the reaction heat to the endothermic dehydrogenation reactor 220, the vaporization of the water may be prevented and the generation amount of hydrogen may be maximized by reducing the usage amount of the water.

The method of transferring the reaction heat of the exothermic dehydrogenation reactor 210 to the endothermic dehydrogenation reactor 220 is not particularly limited. For example, a method of directly transferring heat by contacting the exothermic dehydrogenation reactor 210 and the endothermic dehydrogenation reactor 220 or indirectly transferring heat by generating steam or a heat source by using the reaction heat generated from the exothermic dehydrogenation reactor 210 to then be transferred to the endothermic dehydrogenation reactor 220 or by disposing a heat exchanger between the exothermic dehydrogenation reactor 210 and the endothermic dehydrogenation reactor 220 may be used.

On the other hand, the exothermic dehydrogenation reaction may be carried out under high temperature and high pressure conditions.

Through this, it is possible to generate stable hydrogen within minutes, for example, 2 minutes from the starting of the system operation, so operation responsiveness is excellent and the generation amount of hydrogen may be maximized by preventing the vaporization of water and reducing water consumption. In addition, the generation of $CO_2$ may be suppressed through the pressurized operation of the exothermic dehydrogenation reactor 210.

In addition, if excess water is included in the hydrogen gas after the dehydrogenation reaction, a separate gas-liquid separator may be used, which may increase the volume and weight of the entire system, resulting in a decrease in the hydrogen storage capacity, however the hydrogen storage capacity may be increased and the system cost and weight may be reduced through the high temperature and high pressure operation of the exothermic dehydrogenation reactor 210.

For example, the temperature of the exothermic dehydrogenation reaction may be 10° C. to 400° C., or 100° C. to 250° C. When the temperature of the exothermic dehydrogenation reaction is less than 10° C., the acid or acid aqueous solution may be coagulated or separated, and when the temperature is greater than 400° C., carbon monoxide may be produced, and a secondary reaction may increase.

The pressure of the exothermic dehydrogenation reaction may be 1 bar to 100 bar, or 5 bar to 50 bar. If the pressure of the exothermic dehydrogenation reaction is less than 1 bar, a decompression pump may be used, which may increase the system weight. If the pressure is greater than 100 bar, the exothermic dehydrogenation reaction is inhibited and the weight and the volume of the high temperature/high pressure container may increase.

The generation speed of hydrogen in the exothermic dehydrogenation reactor 210 may be controlled by changing the injection speed of the acid aqueous solution or by fixing the injection speed and changing the injection time (a valve open time). Accordingly, since it is not necessary to use a separate pump, the cost and weight of the system may be reduced.

The LOHC tank 120 includes a liquid organic hydrogen carrier (LOHC).

The liquid organic hydrogen carrier may be a monocyclic hydrogenated aromatic compound, a bicyclic hydrogenated aromatic compound, or a tricyclic hydrogenated aromatic compound, and for example, may include decalin, decahydronaphthalene, tetralin, 1,2,3,4-tetrahydronaphthalene, cyclohexane, dicyclohexyl, methylcyclohexane (MCH), N-ethylcarbazole (NEC), perhydro-N-ethylcarbazole, dibenzyltoluene (DBT), a mixture of biphenyl and diphenyl methane (BPDM), or a combination thereof.

The LOHC tank 120 supplies the liquid organic hydrogen carrier to the endothermic dehydrogenation reactor 220. Between the LOHC tank 120 and the endothermic dehydrogenation reactor 220, a pump 610 for supplying the liquid organic hydrogen carrier to the endothermic dehydrogenation reactor 220 may be included.

The endothermic dehydrogenation reactor 220 generates hydrogen by the endothermic dehydrogenation reaction for the liquid organic hydrogen carrier.

For example, in the endothermic dehydrogenation reaction, hydrogen atoms around aliphatic ring of the hydrogenated LOHC are extracted and aliphatic ring is shifted to aromatic ring. The reaction temperature ranges of 150° C. to 350° C.

As described above, the endothermic dehydrogenation reactor 220 receives the reaction heat generated from the exothermic dehydrogenation reactor 210 and causes the liquid organic hydrogen carrier to undergo the endothermic dehydrogenation reaction. Accordingly, since there is no need to supply heat to the endothermic dehydrogenation reactor 220 after burning a part of the generated hydrogen, heat efficiency may be improved and high hydrogen storage capacity may be secured.

The endothermic dehydrogenation reaction may be carried out in the presence of the catalyst, and the endothermic dehydrogenation reactor 220 may include the catalyst therein. For example, the catalyst of the endothermic dehydrogenation reaction may include $Pt/Al_2O_3$, $Pt/C$, $Pd/Al_2O_3$, $Pd/C$, $Pt-Sn/Al_2O_3$, $Pt-Pd/Al_2O_3$, $Pt-Rh/Al_2O_3$, $Pt-Ru/Al_2O_3$, $Pt-Ir/Al_2O_3$, or a combination thereof.

The catalyst may include 0.1 wt % to 5.0 wt % of a noble metal such as Pt, Pd, Rh, Ru, and Ir with respect to the entire catalyst, and for example, 0.3 wt % to 3.0 wt %. If the content of the noble metal in the catalyst is less than 0.1 wt %, the catalyst reaction speed may be too slow, and if it is greater than 5.0 wt %, commercialization may be difficult in terms of a cost.

The hybrid dehydrogenation reaction system 10 may further include a separate heat source 230 that supplies heat to the endothermic dehydrogenation reactor 220 if desired. When the heat transferred from the exothermic dehydrogenation reactor 210 is insufficient for the endothermic dehydrogenation reaction, insufficient reaction energy may be supplied through a separate heat source 230.

The type of heat source 230 is not particularly limited, and as an example, a hydrogen burner that generates heat by partially combusting the generated hydrogen may be used, or an electric heater composed of a heat wire or the like may be used.

Meanwhile, when the endothermic dehydrogenation reaction in the endothermic dehydrogenation reactor 220 is a gas phase reaction, the hybrid dehydrogenation reaction system 10 may further include a hydrogen separator 300 for separating hydrogen and the dehydrogenated LOHC from the reaction product generated in the endothermic dehydrogenation reactor 220.

For example, in the case of the LOHC reacting in a gaseous state such as MCH, BPDM, etc., the LOHC may pass through the hydrogen separator 300 to separate the generated hydrogen from the dehydrogenated LOHC, and in the case of the LOHC reacting in a liquid state such as NEC or DBT, the LOHC may not pass the hydrogen separator 300.

Hydrogen generated from the exothermic dehydrogenation reactor 210 and the endothermic dehydrogenation reactor 220 is transferred to the buffer tank 400. The buffer tank 400 receives and stores a certain amount of hydrogen gas.

If desired, hydrogen can be compressed to 1 bar to 200 bar through pressure regulators 710, and 720 and stored in the buffer tank 400. To this end, the hybrid dehydrogenation reaction system 10 may include a pressure regulator 720 between the exothermic dehydrogenation reactor 210 and the buffer tank 400, or may include a pressure regulator 710 between the endothermic dehydrogenation reactor 220 and the buffer tank 400.

The fuel cell stack 500 is positioned downstream of the buffer tank 400 to receive hydrogen gas from the buffer tank 400. For example, hydrogen gas may be received from the buffer tank 400 through an intake port such as a valve.

The fuel cell stack 500 generates water by reacting the supplied hydrogen with oxygen and simultaneously generates the electrical energy. The water produced by the fuel cell stack 500 is exhausted through exhaust means such as valves, for example.

At this time, the water exhausted from the fuel cell stack 500 is recycled to the acid aqueous solution tank 110, the exothermic dehydrogenation reactor 210, a separate water tank, or all of them, thereby increasing the hydrogen storage capacity based on the material.

In addition, heat generated from the fuel cell stack 500 is transferred to the endothermic dehydrogenation reactor 220 as needed, so that insufficient heat used for the endothermic dehydrogenation reaction can be compensated.

The fuel cell stack 500 may be any device that converts the hydrogen gas into usable electrical energy, for example, a proton exchange membrane fuel cell (PEMFC), an alkaline fuel cell (AFC), a phosphoric acid fuel cell (PAFC), or a molten carbonate salt fuel. Cell (MCFC), or a solid oxide fuel cell (SOFC), etc., but the present disclosure is not limited thereto.

For example, the fuel cell stack 500 may pass the generated electrical energy through a power converter such as a DC converter, an inverter, or a charge controller. The power converter outputs some of the electrical energy to an electrical load through a load interconnector, and the other part of the electrical energy may be sent back to the energy storage through a recharge interconnector. Another part of the electrical energy may be used to supply power to the control unit.

The hybrid dehydrogenation reaction system 10 may further include an additional pump, filter, or both, if desired, and may further include a control apparatus that controls the operation of the hybrid dehydrogenation reaction system 10.

As described above, the pumps 610 and 620 may be used to supply the acid aqueous solution of the acid aqueous solution tank 110 to the exothermic dehydrogenation reactor 210, or to supply the liquid organic hydrogen carrier of the LOHC tank 120 to the endothermic dehydrogenation reactor 220. Further, an additional pump may be included to supply hydrogen gas generated in the exothermic dehydrogenation reactor 210 and the endothermic dehydrogenation reactor 220 to the buffer tank 400 or the fuel cell stack 500.

The filter may substantially remove unwanted particles contained in the hydrogen gas by filtering the generated hydrogen gas. The filter may be positioned between the exothermic dehydrogenation reactor 210, the endothermic dehydrogenation reactor 220, the hydrogen separator 300, the buffer tank 400, or the fuel cell stack 500, particularly between the buffer tank 400 and the fuel cell stack 500.

The control apparatus may be provided to control the operation by being connected to a plurality of pumps, regulators, needle valves, check valves, ball valves, and multi-direction valves by a control line.

As such, the hybrid dehydrogenation reaction system 10 has excellent responsiveness as it may generate the stable hydrogen within 2 minutes through the high temperature and high pressure reaction of the exothermic dehydrogenation reactor 210 at the start of the system operation. The heat efficiency may be maximized by using the heat H generated from the exothermic dehydrogenation reactor 210 as a heat source for the endothermic dehydrogenation reaction of the endothermic dehydrogenation reactor 220. Thereby, high hydrogen storage capacity, stable heat treatment, and improved hydrogen generation speed are possible through the parallel hydrogen production of the exothermic dehydrogenation reactor 210 and the endothermic dehydrogenation reactor 220.

Hereinafter, specific embodiments of the disclosure are presented. However, the embodiments described below are only intended to specifically illustrate or describe the disclosure, and the scope of the disclosure is not limited thereto.

(Exothermic Dehydrogenation Reaction Evaluation Method)

The chemical hydride of the solid state is loaded in a high temperature and high pressure exothermic dehydrogenation reactor 210. The acid aqueous solution mixed with a predetermined molar ratio is injected using a syringe or HPLC pump. At this time, the injection speed may be adjusted from 0.01 mL/min to 20 mL/min, and may vary depending on the amount of the chemical hydride.

The pressure and temperature are measured and a predetermined pressure and temperature are maintained through valve control and cooling. In some cases, $H_2O$ may be injected first and then acid may be injected.

The hydrogen conversion rate may be calculated by Equation 1 below, and the flow rate and purity are measured using a mass flow meter and gas chromatography (GC).

Hydrogen conversion rate=(an amount of hydrogen exhausted outside a reactor through a mass flow meter+(a pressure at a room temperature after a reaction)×(a reactor volume))/(a theoretical produced amount of hydrogen)   [Equation 1]

Embodiment 1

By using an exothermic dehydrogenation reactor, in a room temperature and atmospheric pressure condition, the dehydrogenation reaction was performed using the chemical hydride of $NaBH_4$ and the acid of HCOOH, and at this time, the hydrogen storage capacity ($H_2$ storage capacity, wt %) was measured by performing the dehydrogenation reaction while changing the reaction molar ratio of $NaBH_4$: $\alpha HCOOH$:$\beta H_2O$ with $0 \leq \alpha \leq 1$, $3 \leq \beta \leq 4$ and $\alpha+\beta=4$. The results are shown in FIG. 2.

Figure 2:
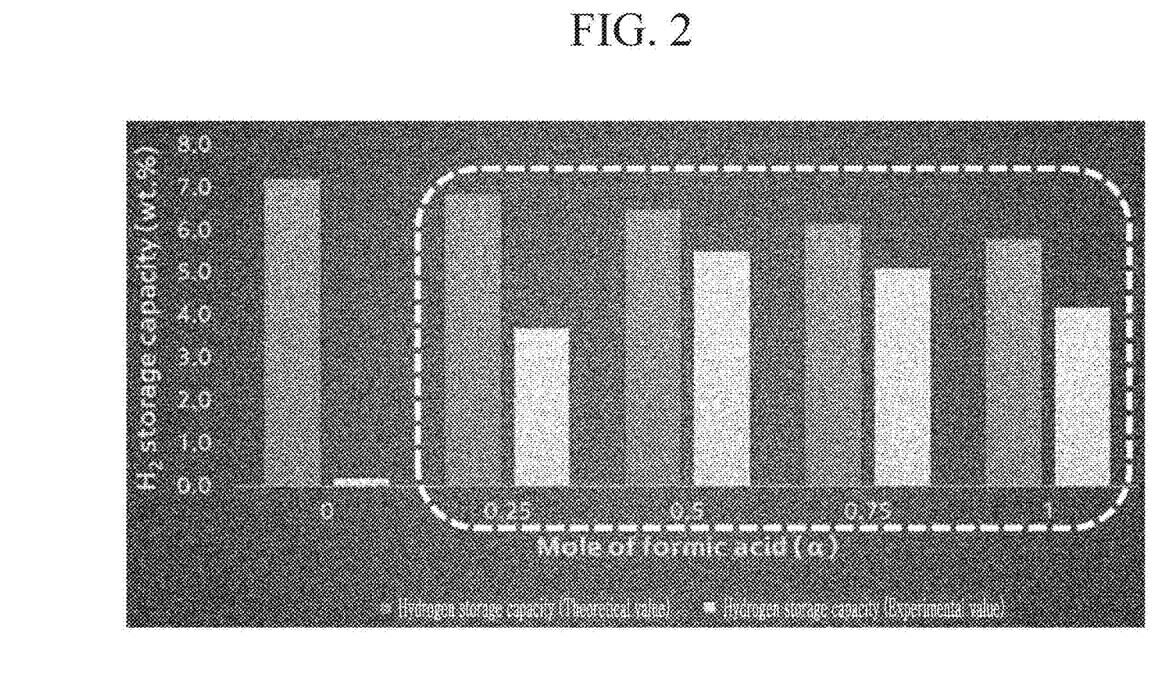
FIG. 2 is a graph showing a result of measuring hydrogen storage capacity of an exothermic dehydrogenation reactor in Embodiment 1.

Referring to FIG. 2, in Embodiment 1, the reaction like in Reaction Formula 2 below was performed, in the room temperature/atmosphere condition, a reaction mole sum of HCOOH and $H_2O$ was maintained at 4 (for example, to minimize water use), and as a result of the reaction, it was confirmed that hydrogen was generated under the condition of 0.25 mol to 1 mol of HCOOH, and hydrogen, which was close to the theoretical storage amount, was generated at 0.5 mol, particularly.

[Reaction Formula 2]

Embodiment 2

By using the exothermic dehydrogenation reactor, the reaction molar ratio of $NaBH_4$:$\alpha HCOOH$:$\beta H_2O$ was fixed with $\alpha=0.5$ and $\beta=3.5$, and the hydrogen storage capacity was measured while changing the temperature to 25° C. to 300° C. and the pressure to 1 bar to 50 bar. The results thereof are shown in FIG. 3.

Figure 3:
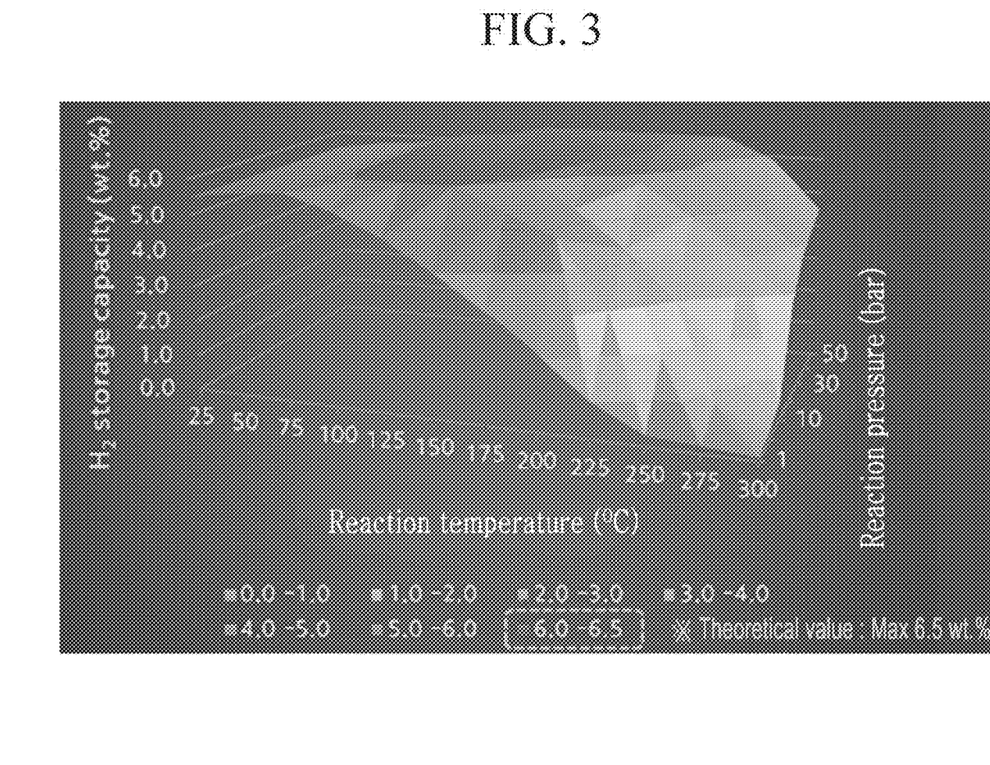
FIG. 3 is a graph showing a result of measuring hydrogen storage capacity of an exothermic dehydrogenation reactor in Embodiment 2.

Referring to FIG. 3, the reaction temperature and pressure are increased to prevent the water vaporization and obtain the same hydrogen generation amount as the theoretical value, and as a result of confirming the optimal reaction condition, it was confirmed that the hydrogen storage capacity is 6 wt % or greater at a temperature of 100° C. to 250° C. and a pressure of 5 bar to 50 bar, and particularly, the conversion rate of 97% was achieved in the range of 100° C. to 250° C. and 30 bar to 50 bar.

Embodiment 3

By using the exothermic dehydrogenation reactor, in the 180° C. and 30 bar condition, the hydrogen storage capacity was measured while changing the reaction molar ratio of $NaBH_4$:$\alpha HCOOH$:$\beta H_2O$ to $\alpha=0.5$ and $2 \leq \beta \leq 4$. The results thereof are shown in FIG. 4.

Figure 4:
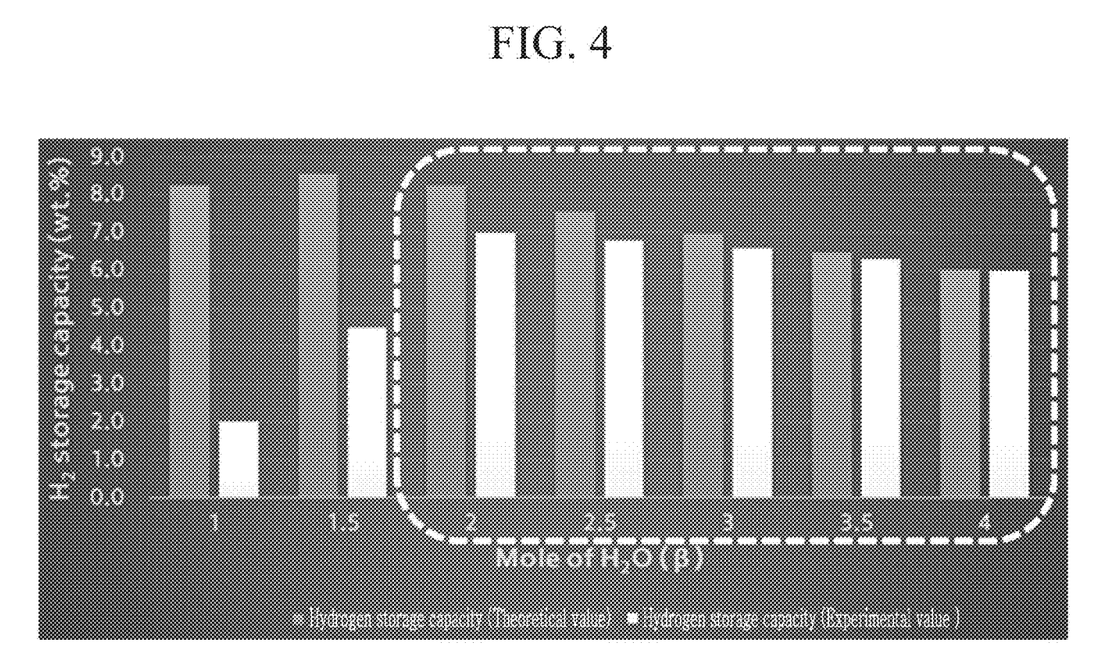
FIG. 4 is a graph showing a result of measuring hydrogen storage capacity of an exothermic dehydrogenation reactor in Embodiment 3.

Referring to FIG. 4, as a result confirming the condition to minimize the water usage amount in the high temperature/high pressure condition, when HCOOH is 0.5 mol, $H_2O$ may be reduced to 2 mol, so that the hydrogen storage capacity may theoretically be up to 8.3 wt % and may be achieved experimentally up to 7.0 wt % (the room temperature/atmospheric pressure condition: 5.5 wt %).

Embodiment 4

By using the exothermic dehydrogenation reactor, in the 180° C. and 30 bar condition, the hydrogen storage capacity is measured while changing the reaction molar ratio of $NaBH_4$:$\alpha HCOOH$:$\beta H_2O$ to $0 \leq \alpha \leq 0.7$, $1.8 \leq \beta \leq 2.5$, and $\alpha+\beta=2.5$. The results are shown in FIG. 5.

Figure 5:
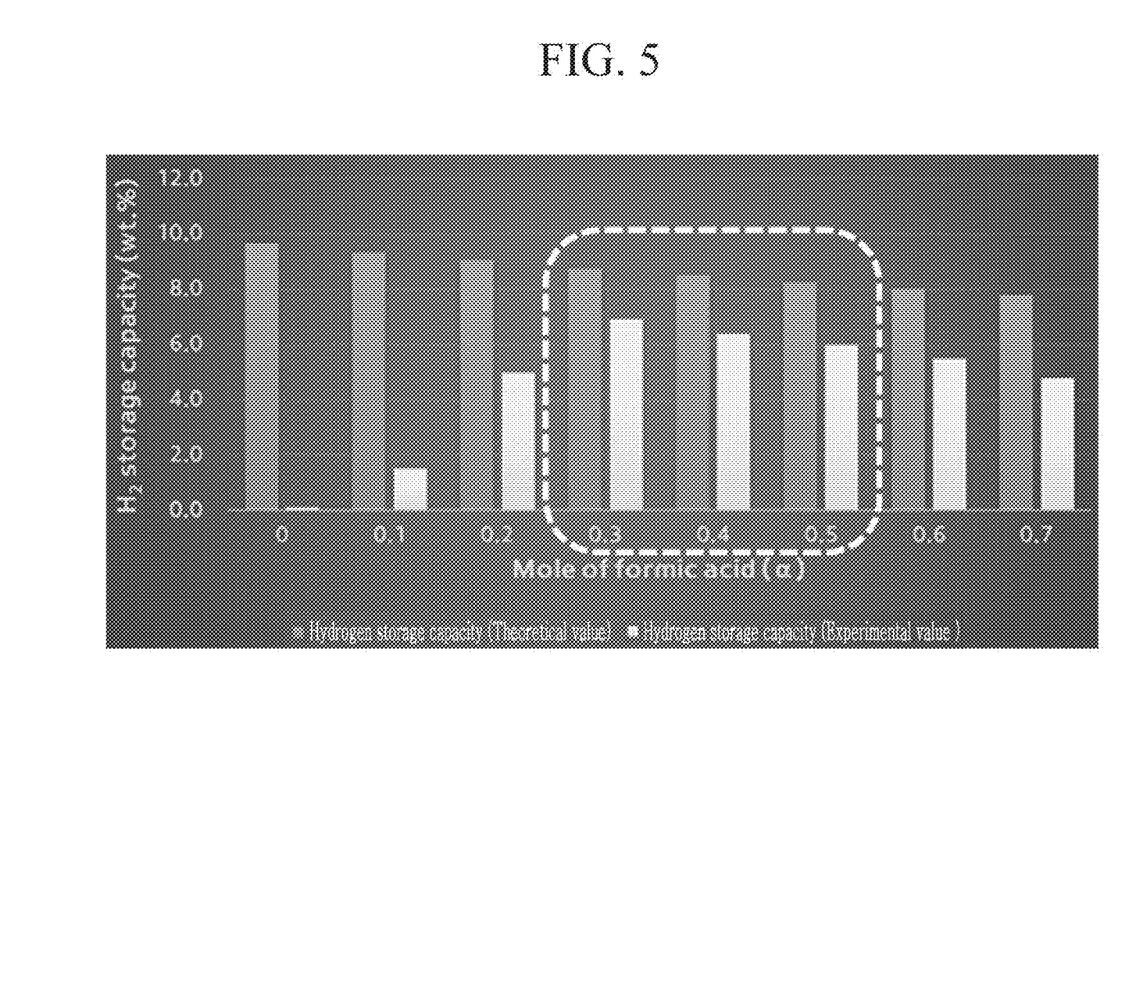
FIG. 5 is a graph showing a result of measuring hydrogen storage capacity of an exothermic dehydrogenation reactor in Embodiment 4.

Referring to FIG. 5, in order to minimize the amount of the used water, after fixing the sum of the reaction molar ratio of HCOOH and $H_2O$ at 2.5, the amount of hydrogen generated according to the HCOOH molar ratio was measured and it was confirmed that the hydrogen storage capacity is 6 wt % or greater in the range of HCOOH of 0.3 mol to 0.5 mol.

Embodiment 5

In order to confirm the reaction temperature range of the endothermic dehydrogenation reactor, methylcyclohexane (MCH) was dehydrogenated to calculate the reaction starting temperature according to the reaction pressure. The results are shown in FIG. 6.

Figure 6:
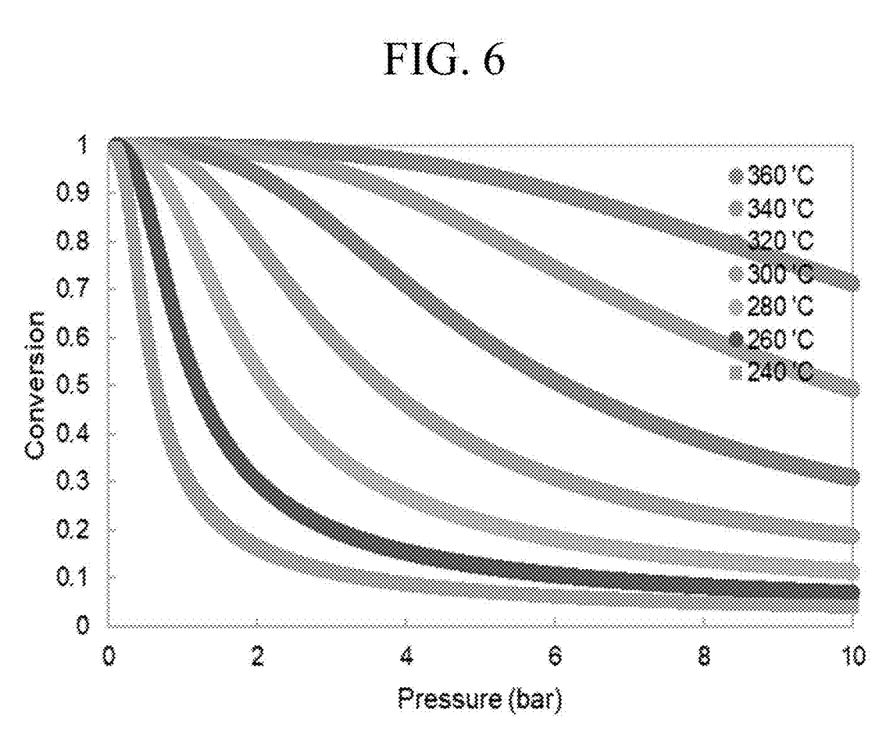
FIG. 6 is a graph showing a result of measuring a reaction starting temperature depending on a reaction pressure of an endothermic dehydrogenation reactor in Embodiment 5.

Referring to FIG. 6, it may be seen that the lower the reaction pressure, the lower the reaction starting temperature for methylcyclohexane, and other types of LOHC are also expected to have an effect of reducing the reaction temperature due to the reduced pressure. Due to this decompression effect, the reaction temperature of the LOHC is expected to be generally 250° C. or less.

Embodiment 6

Figure 7:
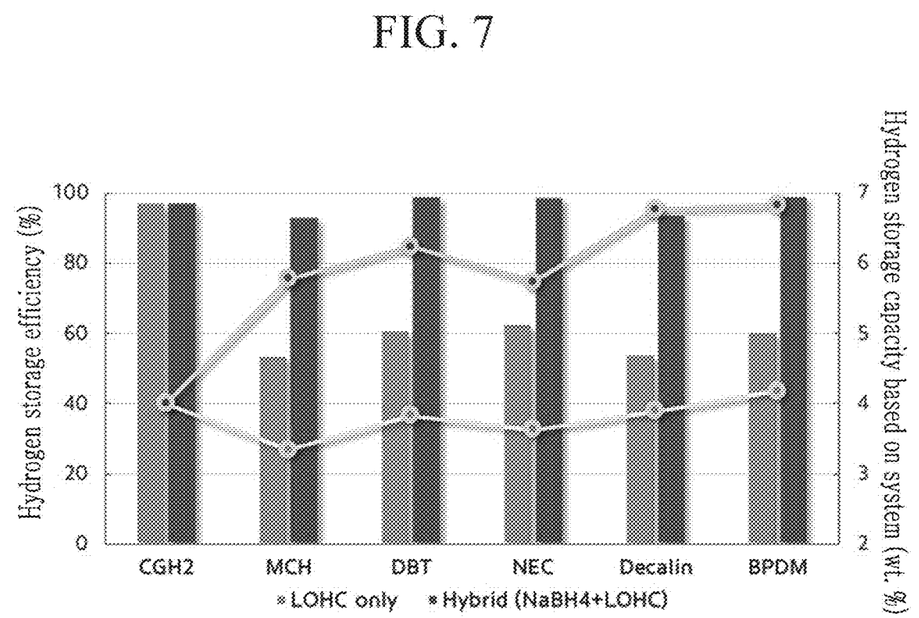
FIG. 7 is a graph showing a result of comparing hydrogen storage efficiency for each LOHC type of a hybrid dehydrogenation reaction system in Embodiment 6.

FIG. 7 is a graph showing a result of comparing hydrogen storage efficiency for each LOHC type of supplying heat for an endothermic dehydrogenation reaction of an endothermic dehydrogenation reactor by using a hydrogen combustion device (a hydrogen burner) as a case 1 (an LOHC only) and a $NaBH_4$-LOHC hybrid system (Hybrid) configured of an exothermic dehydrogenation reactor and an endothermic dehydrogenation reactor without a separate heat source as a case 2.

In FIG. 7, CGH2 represents a conventional compress gas (Compressed Hydrogen Gas) system, MCH represents methylcyclohexane, DBT represents dibenzyl toluene, NEC represents N-ethyl carbazole, Decalin represents decalin, and BPDM represents a mixture of biphenyl and diphenylmethane as an LOHC.

Referring to FIG. 7, In the case of using the internal heat source (the LOHC only), the hydrogen storage capacity does not reach the level of the conventional compressed gas CGH2, whereas in the case of the $NaBH_4$-LOHC hybrid system (Hybrid), it may be confirmed that the hydrogen storage capacity may be improved up to the level of 6.8 wt % while increasing the hydrogen storage efficiency by greater than 93%.

Figure 8:
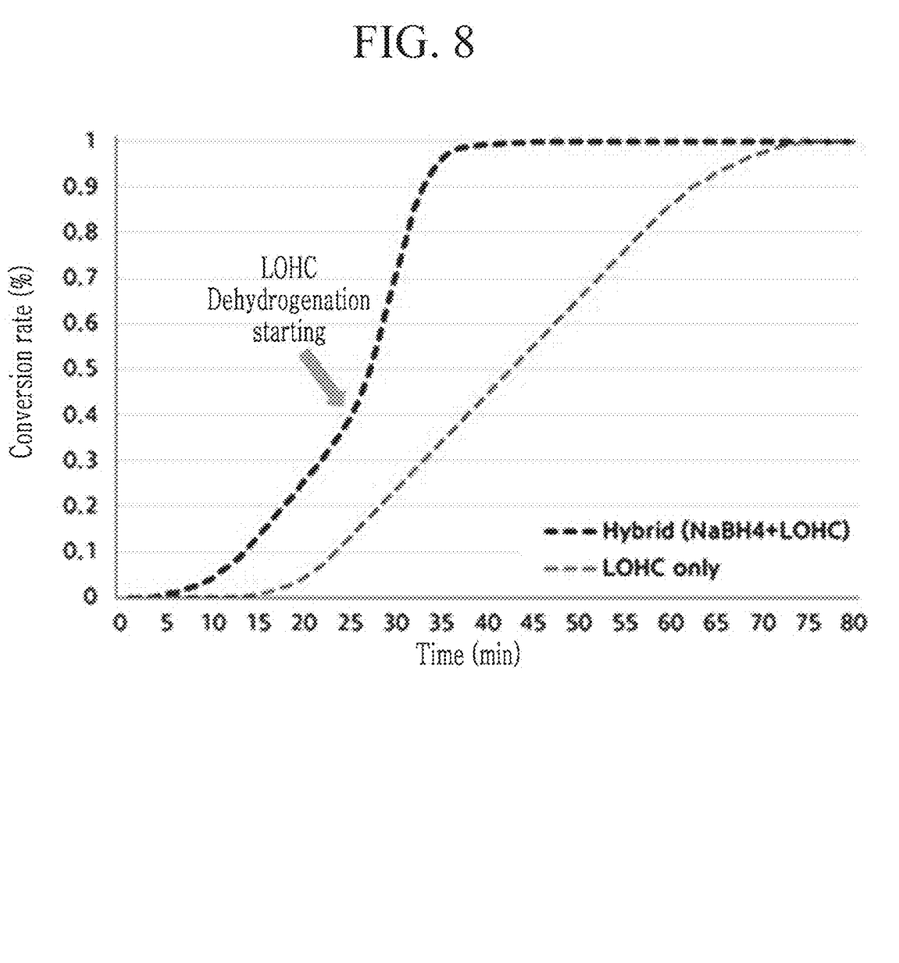
FIG. 8 is a graph showing a result measuring a hydrogen conversion rate change depending on time of a hybrid dehydrogenation reaction system in Embodiment 6.

FIG. 8 shows the hydrogen conversion rate change depending on a time while generating 1 kg of hydrogen for a case 1 (an LOHC only) using a hydrogen combustion device (a hydrogen burner) and a case 2 using a $NaBH_4$-LOHC hybrid system (Hybrid) configured of an exothermic dehydrogenation reactor and an endothermic dehydrogenation reactor without a separate heat source.

Referring to FIG. 8, in the case of the conventional LOHC system (the LOHC only), the hydrogen generation starts, in one example, after about 12 minutes to achieve the temperature (for example, 300° C.) required for the reaction, whereas in the case of the hybrid system (Hybrid), it may be confirmed that the rapid hydrogen generation is possible because the pressure may be raised to greater than 30 bar within 2 minutes. In addition, as the hydrogen production begins in the endothermic dehydrogenation reactor sufficiently heated by the reaction heat generated in the exothermic dehydrogenation reactor, it may be confirmed that the simultaneous generation of hydrogen in both reactors occurs so that the improvement of the hydrogen generation speed is observed.

As described above, the hybrid dehydrogenation reaction system according to an embodiment may generate hydrogen without a separate heat source by hybridizing the exothermic dehydrogenation reactor and the endothermic dehydrogenation reactor in order to improve the heat efficiency of the endothermic dehydrogenation reactor.

The hybrid dehydrogenation reaction system was confirmed to have the excellent operation responsiveness and hydrogen generation speed as well as the hydrogen storage capacity improvement from the increasing of the heat efficiency. Specifically, compared to the endothermic dehydrogenation reactor-alone system, it was confirmed that the hybrid dehydrogenation reaction system, in one example, improved the hydrogen storage efficiency by about 40% by removing the separate heat source and almost satisfied a DOE commercially available criterion of 6.5 wt %.

In addition, compared to the endothermic dehydrogenation reactor-alone system, which takes greater than 10 minutes from the time that the system is turned on to generate hydrogen, it was confirmed that the hybrid dehydrogenation reaction system may generate hydrogen quickly and stably within 2 minutes from the low reaction temperature condition of the exothermic dehydrogenation reactor and the rapid boosting technology.

When the endothermic dehydrogenation reactor is sufficiently heated by the reaction heat of the exothermic dehydrogenation reactor, it is possible to simultaneously generate hydrogen from the exothermic and endothermic dehydrogenation reactors, which contributes to the high speed of the hydrogen generation in the hybrid dehydrogenation reaction system. Due to the features of high hydrogen storage capacity, fast operation responsiveness, and hydrogen generation speed, the hybrid dehydrogenation reaction system is expected to make a large contribution to the commercially available endothermic dehydrogenation reactor-alone system.

While this disclosure has been described in connection with what is presently considered to be practical embodiments, it is to be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

10: hybrid dehydrogenation reaction system
110: acid aqueous solution tank
120: LOHC tank
210: exothermic dehydrogenation reactor
220: endothermic dehydrogenation reactor
230: heat source
300: hydrogen separator
400: buffer tank
500: fuel cell stack
610, 620: pump
710, 720: pressure regulator

What is claimed is:

1. A hybrid dehydrogenation reaction system comprising:
   an acid aqueous solution tank including an acid aqueous solution;
   an exothermic dehydrogenation reactor including a chemical hydride of a solid state and receiving the acid aqueous solution from the acid aqueous solution tank for an exothermic dehydrogenation reaction of the chemical hydride and the acid aqueous solution to generate hydrogen;
   an LOHC tank including a liquid organic hydrogen carrier (LOHC); and
   an endothermic dehydrogenation reactor receiving the liquid organic hydrogen carrier from the LOHC tank and generating hydrogen through an endothermic dehydrogenation reaction of the liquid organic hydrogen carrier by using heat generated from the exothermic dehydrogenation reactor.

2. The hybrid dehydrogenation reaction system of claim 1, wherein the chemical hydride comprises $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or a mixture thereof.

3. The hybrid dehydrogenation reaction system of claim 1, wherein the acid comprises sulfuric acid, nitric acid, phosphoric acid, hydrochloric acid, boric acid, a heteropoly acid, acetic acid, formic acid, malic acid, citric acid, tartaric acid, ascorbic acid, lactic acid, oxalic acid, succinic acid, tauric acid, or a mixture thereof.

4. The hybrid dehydrogenation reaction system of claim 1, wherein in the exothermic dehydrogenation reactor, and wherein the exothermic dehydrogenation reaction is performed by reacting 1 mol of hydrogen atoms of the chemical hydride with an acid and water at a molar ratio of 0.5 to 2.

5. The hybrid dehydrogenation reaction system of claim 1, wherein in the exothermic dehydrogenation reactor, the temperature of the exothermic dehydrogenation reaction is 10° C. to 400° C. and a pressure is 1 bar to 100 bar.

6. The hybrid dehydrogenation reaction system of claim 1, wherein the liquid organic hydrogen carrier comprises decalin (decahydronaphthalene), tetralin (1,2,3,4-tetrahydronaphthalene), cyclohexane, dicyclohexyl, methylcyclohexane (MCH), N-ethylcarbazole (NEC), perhydro-N-ethylcarbazole, dibenzyltoluene (DBT), a mixture of biphenyl and diphenyl methane (BPDM), or a combination thereof.

7. The hybrid dehydrogenation reaction system of claim 1, wherein in the endothermic dehydrogenation reactor, the endothermic dehydrogenation reaction is performed under a presence of a catalyst comprising $Pt/Al_2O_3$, $Pt/C$, $Pd/Al_2O_3$, $Pd/C$, $Pt-Sn/Al_2O_3$, $Pt-Pd/Al_2O_3$, $Pt-Rh/Al_2O_3$, $Pt-Ru/Al_2O_3$, $Pt-Ir/Al_2O_3$, or a combination thereof.

8. The hybrid dehydrogenation reaction system of claim 7, wherein the catalyst includes 0.1 wt % to 5.0 wt % of a noble metal with respect to the entire catalyst.

9. The hybrid dehydrogenation reaction system of claim 1, wherein in the endothermic dehydrogenation reactor, the endothermic dehydrogenation reaction takes place at 150° C. to 350° C.

10. The hybrid dehydrogenation reaction system of claim 1, wherein the hybrid dehydrogenation reaction system further includes a heat source supplying heat to the endothermic dehydrogenation reactor.

11. The hybrid dehydrogenation reaction system of claim 1, further comprising:
   a fuel cell stack generating electricity and water by receiving hydrogen and oxygen produced from the exothermic dehydrogenation reactor, the endothermic dehydrogenation reactor, or both the exothermic dehydrogenation reactor and the endothermic dehydrogenation reactor.

12. The hybrid dehydrogenation reaction system of claim 11, wherein the endothermic dehydrogenation reactor further uses heat generated from the fuel cell stack for the endothermic dehydrogenation reaction of the liquid organic hydrogen carrier.

13. The hybrid dehydrogenation reaction system of claim 1, wherein the hybrid dehydrogenation reaction system further includes a hydrogen separator separating hydrogen from a reaction product generated from the endothermic dehydrogenation reactor.

14. The hybrid dehydrogenation reaction system of claim 1, wherein the hybrid dehydrogenation reaction system further includes a buffer tank storing hydrogen generated from the exothermic dehydrogenation reactor and the endothermic dehydrogenation reactor.

15. The hybrid dehydrogenation reaction system of claim 1, wherein the hybrid dehydrogenation reaction system further includes a pressure regulator between the exothermic dehydrogenation reactor and the buffer tank, between the endothermic dehydrogenation reactor and the buffer tank, or both.

16. The hybrid dehydrogenation reaction system of claim 1, wherein the hybrid dehydrogenation reaction system further includes:
   a pump for supplying the acid aqueous solution from the acid aqueous solution tank to the exothermic dehydrogenation reactor;
   a pump for supplying the liquid organic hydrogen carrier from the LOHC tank to the endothermic dehydrogenation reactor; or
   both the pump for supplying the acid aqueous solution and the pump for supplying the liquid organic hydrogen carrier.

* * * * *